(12) United States Patent
Yamaguchi et al.

(10) Patent No.: US 8,345,992 B2
(45) Date of Patent: Jan. 1, 2013

(54) METHOD AND DEVICE OF IMAGE ENCODING AND IMAGE PROCESSING APPARATUS

(75) Inventors: Muneaki Yamaguchi, Inagi (JP); Masatoshi Kondo, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1220 days.

(21) Appl. No.: 12/164,963

(22) Filed: Jun. 30, 2008

(65) Prior Publication Data

US 2009/0103816 A1 Apr. 23, 2009

(30) Foreign Application Priority Data

Oct. 23, 2007 (JP) ................. 2007-275279

(51) Int. Cl.
*G06K 9/36* (2006.01)
*H04N 11/04* (2006.01)
*H04N 5/14* (2006.01)
(52) U.S. Cl. ............ 382/232; 348/699; 348/416.1
(58) Field of Classification Search .......... 382/232; 348/699, 416.1
See application file for complete search history.

(56) References Cited

U.S. PATENT DOCUMENTS

| | | | | |
|---|---|---|---|---|
| 5,592,226 A | * | 1/1997 | Lee et al. | 375/240.14 |
| 5,739,872 A | * | 4/1998 | Kim et al. | 348/699 |
| 5,982,439 A | * | 11/1999 | Parke | 375/240.16 |
| 7,158,683 B2 | | 1/2007 | Yokose | |
| 2007/0206673 A1 | * | 9/2007 | Cipolli et al. | 375/240.1 |
| 2009/0074078 A1 | | 3/2009 | Yamamoto et al. | |

FOREIGN PATENT DOCUMENTS

| | | |
|---|---|---|
| JP | 06-113286 A | 4/1994 |
| JP | 11-004437 A | 1/1999 |
| JP | 11-234671 A | 8/1999 |
| JP | 05-300492 A | 11/2003 |
| JP | 2003-348358 A | 12/2003 |
| WO | WO2006/112139 A1 | 10/2006 |

OTHER PUBLICATIONS

Iain E. G. Richardson,"H.264 and MPEG-4 Video Compression", ISBN 0-470-84837-5, published 2003.*
*Advanced video coding for generic audiovisual services, ITU-T Recommendation H.264* International Telecommunication Union (ITU) (Mar. 2005).
Japan Patent Office (JPO) office action for JPO patent application JP2007-275279 (Sep. 24, 2009).

* cited by examiner

*Primary Examiner* — Chan S Park
*Assistant Examiner* — Ha Le
(74) *Attorney, Agent, or Firm* — Kilpatrick Townsend & Stockton LLP

(57) ABSTRACT

Provided is an image encoding method and device capable of encoding moving image random allowing access with low delay and high compression. The image encoding method which inputs image data and encodes the image data using a reference picture about the image data and a difference between the reference picture and the image data, and performs the steps of: setting an image output availability parameter indicating that it is possible to decode the image data to output the same if past pictures fall within a fixed range have been decoded, when decoding the image data which has been encoded; calculating influenced range information indicating a range where pictures encoded in the past influence a target picture to be encoded when encoding the image data; and controlling a range of the reference picture upon encoding such that the influenced range information calculated does not exceed the image output availability parameter.

10 Claims, 9 Drawing Sheets

METHOD AND DEVICE OF IMAGE ENCODING AND IMAGE PROCESSING APPARATUS

CROSS-REFERENCE TO RELATED APPLICATION

The present application claims priority from Japanese Patent Application No. JP 2007-275279 filed on Oct. 23, 2007, the content of which is hereby incorporated by reference into this application.

FIELD OF THE INVENTION

The present invention relates to a technique for encoding/decoding a moving image. More particularly, the present invention relates to a technique effectively applied to a method and a device for encoding/decoding a moving image with a reduced delay time.

DESCRIPTION OF THE RELATED ART

In a coding technique of a still/moving picture (image) represented by JPEG or MPEG-2 conventionally known, an inputted image in a broad transmission band (for example, about 1.5 Gbps in HD-SDI (High Definition Serial Digital Interface)) can be applied to a low transmission band (for example, about 15 Mbps in digital terrestrial broadcasting) by utilizing characteristics generally possessed by image information, namely, such characteristics that the image information possesses high correlation between adjacent pixels and between adjacent frames and further reducing redundant information such as high frequency components whose change is difficult to recognize visually.

As such a technique, techniques disclosed in Japanese Patent Application Laid-Open Publication No. 05-300492 (Patent Document 1), Japanese Patent Application Laid-Open Publication No. 11-4437 (Patent Document 2), Japanese Patent Application Laid-Open Publication No. 11-234671 (Patent Document 3), Japanese Patent Application Laid-Open Publication No. 2003-348358 (Patent Document 4), and the like have been proposed.

In recent years, H.264/AVC picture/image coding method which has been established by a collaborative project of ISO-MPEG (International Organization for Standardization/Moving Picture Experts Group) and ITU-T/VCEG (International Telecommunication Union-Telecommunication standardization sector/Video Coding Experts Group) have been widely used owing to its compressibility performance. The H.264/AVC Standard is described in detail, for example, in ISO/IEC 14996-10/ITU-T Rec. H.264 "Information technology—Coding of audio-visual objects: Advanced video coding for generic audiovisual services" (March 2005) (Non-Patent Document 1) and the like.

SUMMARY OF THE INVENTION

Meanwhile, according to the H.264/AVC Standard, encoding processing is performed for each 16×16 pixel block unit called "macroblock". In prediction in frame (intra frame) or between frames (inter frame), there is such a stipulation that a macroblock is divided to blocks of 16×16 pixels, 8×8 pixels, 4×4 pixels, and so forth and coding is performed for each block by a prediction processing. According to the techniques, coding efficiency can be improved by selectively using many stipulated prediction modes according to minute/fine motion or pattern of input images.

Outlines of the intra-frame prediction processing and the between-frame prediction processing will be explained below using H.264/AVC Standard as an example.

The intra-frame prediction is a method for improving a compressibility utilizing pixel correlation between adjacent pixels within a same frame. For example, Intra 4×4 DC prediction processing which is one of the intra-frame prediction modes is a prediction performed for each 4×4 pixels, where an average value of the values of total 8 pixels of 4 pixels adjacent to an upper side of the 4×4 pixels block and 4 pixels adjacent to the left side of the 4×4 pixels block is used as a prediction value. A difference between each pixel value in the block and the prediction value is transformed, and applied with quantization and variable length encoding, and then stored in a bitstream. The intra-frame prediction mode of H.264/AVC is set to 8 modes for each 4×4 pixels, 8 modes for each 8×8 pixels, and 4 modes for each 16×16 pixels. Note that, the above are directed to brightness data, and 4 modes are set to color difference data separately from brightness.

The inter-frame prediction is a method for improving a compressibility utilizing pixel correlation between pictures of an image. For example, P4×4 prediction processing which is one of forward prediction modes generates a prediction image to a targeted block to be coded using an area similar to a picture positioned forward (the past) at a processing time. The inter-frame prediction has a plurality of prediction modes corresponding to prediction pixel sizes, where a prediction picture is generated according to a mode adopted. In H.264/AVC, the forward prediction includes eight kinds of modes, namely, 4×4 pixels, 8×4 pixels, 4×8 pixels, 8×8 pixels, 16×8 pixels, 8×16 pixels, 16×16 pixels, and skip. And, bidirectional prediction includes 23 kinds of prediction modes. From these modes, a mode which achieves the minimum coding cost value is selected to perform encoding.

Generally, when the intra-frame prediction and the inter-frame prediction are compared with each other, a prediction value with a higher accuracy can be obtained in the inter-frame prediction. Therefore, by raising a usage rate of the inter-frame prediction, a difference between each pixel value and a prediction value can be reduced so that a high compressibility can be obtained. On the other hand, since the inter-frame prediction uses other pictures to calculate the prediction value, when a picture which has been used for prediction to decode a targeted picture is not decoded, normal decoding cannot be achieved. In general, a picture (I picture (Intra-coded picture)) configured using only the intra-frame prediction is periodically inserted so that a range of pictures to be used for the inter-frame prediction at decoding is limited. As a result, random access is achieved.

Regarding a moving image stream which does not require random access, there is also a method where only a leading picture is configured as an I picture, and the remaining pictures are configured as pictures (P pictures (Predictive-coded pictures)) including inter-frame prediction so that compressibility except for that to the leading picture is improved. In this method, however, usage is limited since replay from a halfway position is impossible.

On the other hand, it is generally known in the image encoding that delay occurs at encoding and decoding. In such a system that code outputted from the image encoding device is inputted into an image decoding device after an image is inputted into an image encoding device and then a decoding processing is performed to display, a time lag between image inputting of the same picture and displaying the same is a delay time, and the delay time in a conventional image encoding and decoding device has been in a range of about several hundreds milliseconds to several seconds. Nowadays, there is a demand for reduction of delay in image encoding and decoding to such a delay time as 16 milliseconds or less as aiming to simultaneous use with uncompressed image.

It is necessary to suppress fluctuation of a data generation amount so as to realize low delay image encoding and decoding. Generally, image data is transmitted according to a fixed bit rate determined from a data amount of whole image data, and the transmitted image data is stored in a buffer to be processed.

Here, when a large amount of bits exceeding the bit rate is produced in an area where an image picture is present, the data in the buffer is insufficient for processing regarding the area, which results in waiting for transmission of data to the buffer. Unless all processing to the area is completed, the area cannot be displayed, which results in increase of the delay time for displaying the whole image. That is, the delay time is set based on a time required for processing the maximum bit generation amount assumed, and the time is largely influenced by a difference between the bit rate and the maximum bit generation amount, namely, a fluctuation amount of generated data.

In the conventional technology, it is thought that encoding is performed using the following three kinds of methods. First, in a common image encoding method, I picture is periodically inserted in between continuous P pictures. Since a generated bit amount in I picture is more than that in P picture, the delay time must be set so as to match with a processing for I picture. In this case, since fluctuation of the data occurrence amount is large, the delay time is increased. For example, in a digital terrestrial broadcasting, I picture (I frame) is inserted at intervals of 0.5 seconds. Therefore, encoding and decoding delay in a range of about 500 milliseconds to several seconds occurs.

As another method, code can be configured using only I pictures. In this case, since the bit rate becomes large and fluctuation of the data occurrence amount is small, it is possible to reduce the delay time. However, since I picture is generally lower in prediction accuracy than P picture, the compressibility of the former becomes low so that, when code is configured using only I pictures, it is difficult to improve the compressibility.

As still another method, such a configuration that I picture is used only for the leading picture and P pictures are used for the remaining pictures is proposed. In this method, however, replay from a halfway position is impossible as described above, and so usage of this method is severely limited.

In view of these circumstances, the present invention provides a method and a device of image encoding capable of encoding a moving image which allows random access with low delay and high compression.

The typical ones of the inventions disclosed in this application will be briefly described as follows.

An image encoding method according to a typical embodiment of the present invention comprises the steps of: setting a value defining the maximum value of a range of picture influenced upon encoding of an image in advance; conducting management about how the picture is influenced from a past picture separated in terms of time upon prediction processing; and performing control such that the range of a picture influenced actually is less than the above set value.

The effects obtained by typical aspects of the present invention will be briefly described below.

According to a typical embodiment of the present invention, it is possible to provide a method and a device for encoding a moving image which allows random access with low delay and high compression without requiring periodical insertion of I pictures.

BRIEF DESCRIPTION OF THE DRAWINGS

These and other features, objects and advantages of the present invention will become more apparent from the following description when taken in conjunction with the accompanying drawings wherein.

DESCRIPTIONS OF THE PREFERRED EMBODIMENTS

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

<Outline of Embodiments of the Invention>

In encoding of a moving image, a problem about encoding by P picture lies in such a point that it is uncertain how much the processing for the picture is influenced by respective pictures which have been separated in time, because the degrees of influence are different among respective pixels and blocks, and this point is a factor of blocking random access at decoding. If presence and absence of influence from a picture which has been separated in time is made clear, decoding is started from a picture with influence so that the picture is decoded, thereby allowing random access.

Accordingly, in an image encoding device according to an embodiment of the present invention, a distance between pictures in time is grasped using the number of pictures calculated based on a difference between picture numbers, and an image output start picture number Ns is set as a maximum value of a range of pictures influenced at image encoding, namely, as an image output availability parameter indicating how much number of pictures are necessary to be processed at maximum so as to decode the pictures to make an image output. Further, an influenced picture number (a number of influenced pictures) Ne is calculated as influenced range information indicating the degree of actual influence to the picture from the past picture which has been separated in time at a prediction processing and managed so that control is performed such that the influenced picture number Ne is less than the image output start picture number Ns.

Hereinafter, embodiments of the present invention will be described in detail with reference to the accompanying drawings. Note that, components having the same function are denoted by the same reference symbols throughout the drawings for describing the embodiment, and the repetitive description thereof will be omitted.

<First Embodiment>

An image encoding device (encoder) according to a first embodiment of the present invention will be described hereinafter.

Figure 1:
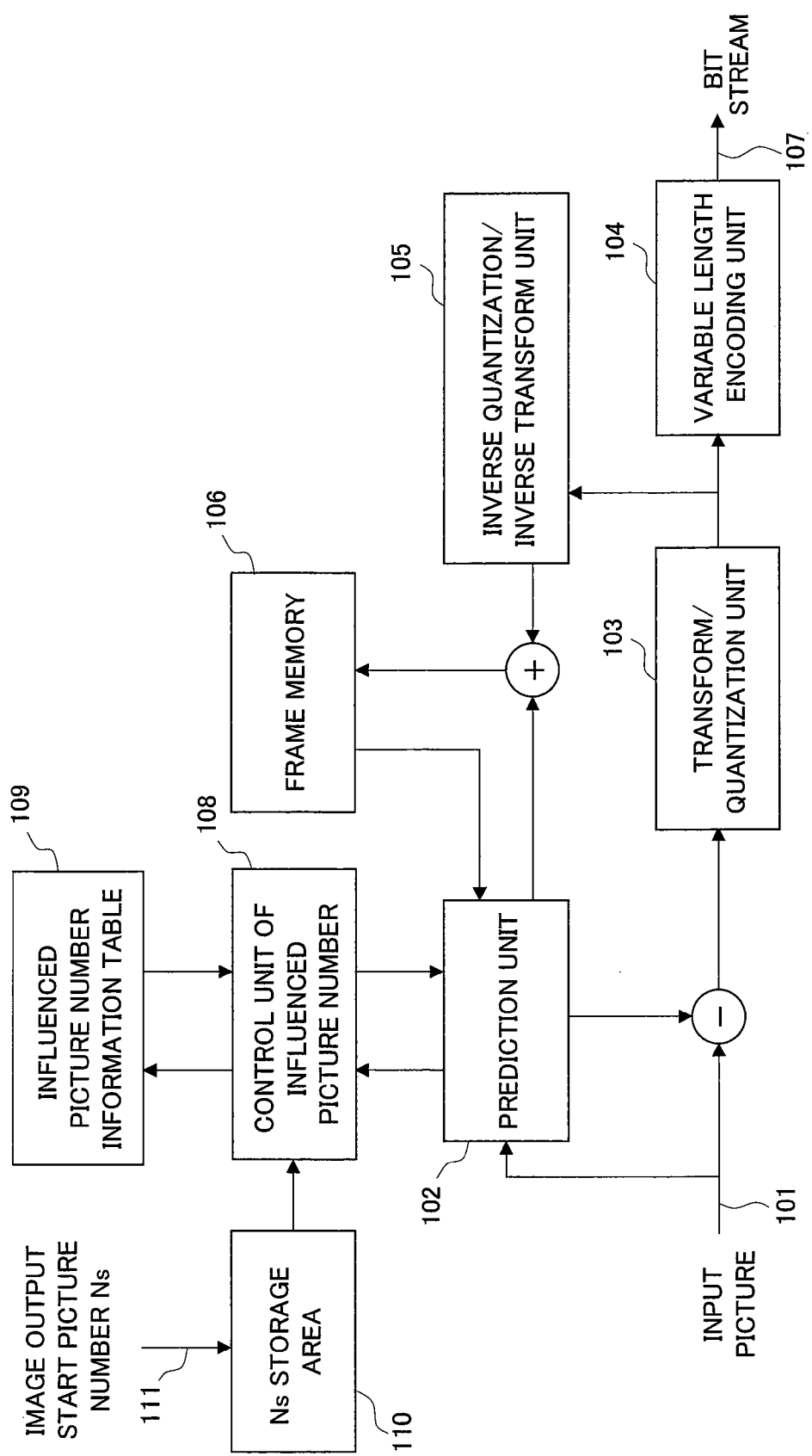
FIG. 1 is a diagram showing a configuration of a processing module in an image encoding device according to a first embodiment of the present invention.

FIG. 1 is a diagram showing a configuration of a processing module in the image encoding device according to the present embodiment. The image encoding device can be mounted on, for example, an LSI, and the LSI can be provided in various image processing apparatuses which perform encoding processing of a moving image, such as a television/video camera, a DVD/HDD recorder, a mobile phone, and a digital camera. The functions of respective processing modules can be mounted as a software operated on a computer system.

The encoding processing module in the image encoding device according to the present embodiment is configured to include: a prediction unit 102; a transform/quantization unit 103; a variable length encoding unit 104; an inverse quantization/inverse transform unit 105, a frame memory 106; a control unit of influenced picture number 108; an influenced picture number information table 109, and an Ns storage area 110.

An input image 101 is inputted into the prediction unit 102, where prediction processing is performed. As the result of the prediction processing, a prediction image is outputted from the prediction unit 102, and a difference between the prediction image and the input image is inputted into the transform/quantization unit 103. Data which has been transformed/quantized by the transform/quantization unit 103 is coded in the variable length encoding unit 104 to be outputted as a bitstream 107. On the other hand, after the transformed/quantized data is inversely quantized/inversely transformed in the inverse quantization/inverse transform unit 105, it is added to the prediction image to be stored in the frame memory 106 for prediction processing in the next stage.

The Ns storage area 110 is means for retaining an image output start picture number Ns 111 which is an image output availability parameter, the influenced picture number information table 109 is means for retaining an influenced picture number Ne which is influence range information, and the control unit of influenced picture number 108 is means for controlling a range of a reference picture at a prediction processing in encoding.

The prediction unit 102 acquires information about whether or not an area of a reference picture to use for prediction processing can be used from the control unit of influenced picture number 108, and it does not use the area as the reference picture when the area is unusable (NG). The control unit of influenced picture number 108 acquires area information of reference picture to use for prediction processing from the prediction unit 102 and it acquires influenced picture number information of a corresponding area from the influenced picture number information table 109. When the control unit of influenced picture number 108 compares the acquired influenced picture number information and the image output start picture number Ns 111 stored in the Ns storage area 110 with each other, if the influenced picture number information is smaller than the image output start picture number Ns 111, the control unit of influenced picture number 108 outputs an OK signal to the prediction unit 102, but if the former is larger than the latter, the control unit of influenced picture number 108 outputs an NG signal to the prediction unit 102.

Figure 2:
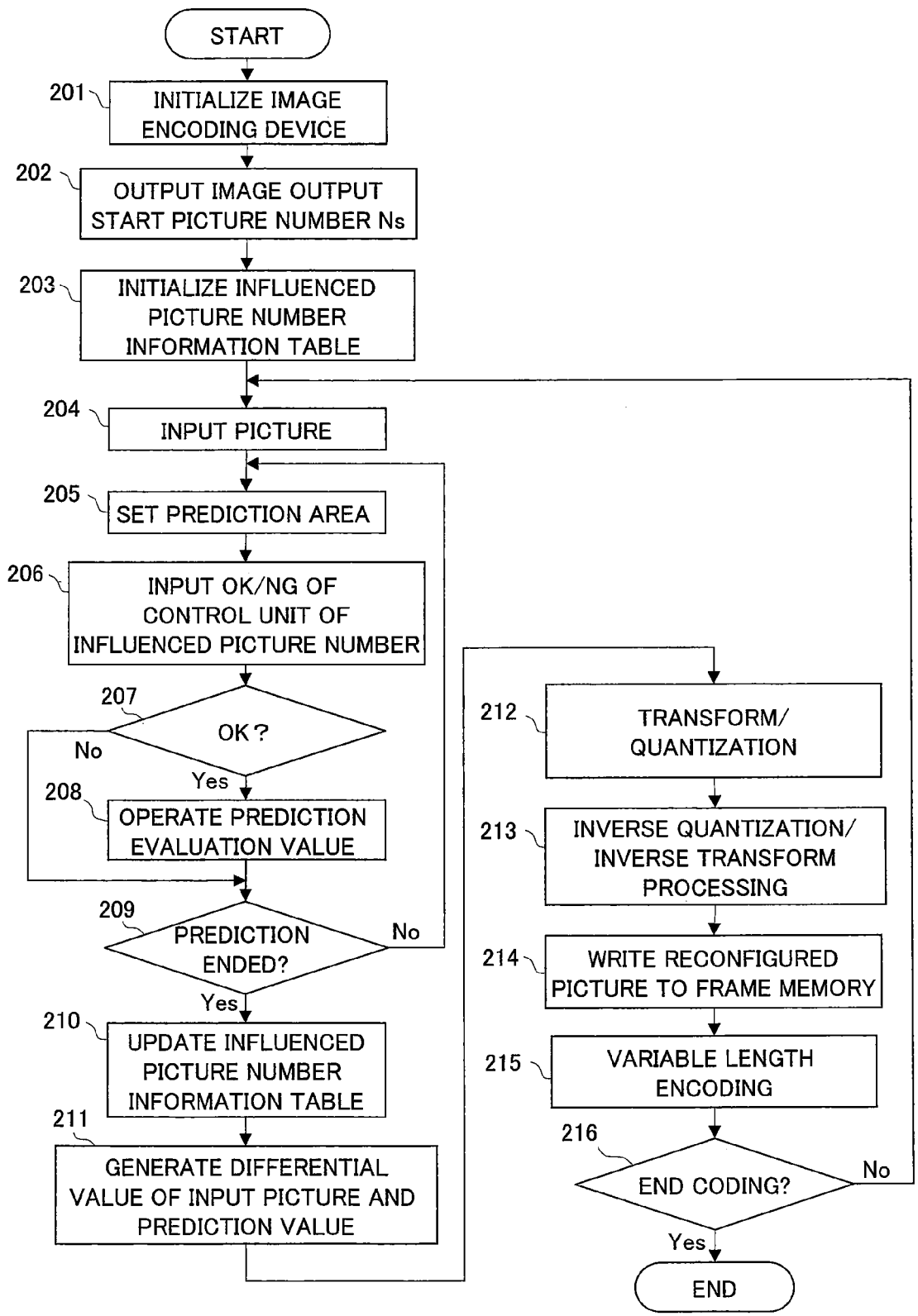
FIG. 2 is a flowchart showing a processing flow of a encoding processing module in the image encoding device according to the first embodiment of the present invention.

Next, a flow of a processing in the image encoding device according to the present embodiment will be described. FIG. 2 is a flowchart showing a flow of a processing in an encoding processing module in the image encoding device according to the present embodiment.

First, the image encoding device is initialized (step 201). Next, the image output start picture number Ns 111 is inputted into the Ns storage area 110 (step 202). Thereafter, the influenced picture number information table 109 is initialized (step 203). As an initialized value at this time, a value larger than the image output start picture number Ns 111 is used.

The following steps are loop-processed until the encoding processing is terminated. First, an input image 101 is inputted (step 204), and a prediction area is set by the prediction unit 102 (step 205). The prediction unit 102 acquires information about whether a prediction area is usable (OK) or unusable (NG) from the control unit of influenced picture number 108 (step 206) and it makes a determination (step 207). In a case of OK, evaluation of a prediction error of the prediction area is performed (step 208), and in a case of NG, determination about whether or not evaluation of all prediction areas has been ended is made without evaluating the prediction area (step 209). When evaluation of all the prediction areas has not been ended, the control returns back to the step of setting the next prediction area (step 205). Note that, when all prediction areas are unusable (NG), such a processing as intra-frame prediction is performed.

After the evaluation of all prediction areas is ended, the influenced picture number information table 109 is updated based on information about the determined prediction area (step 210). Thereafter, a differential value of the input image 101 and the prediction value is generated (step 211) and the differential value is transformed/quantized in the transform/quantization unit 103 (step 212). The transformed/quantized data is inversely quantized/inversely transformed in the inverse quantization/inverse transform unit 105 (step 213) to be written in the frame memory 106 as a reconfigured image (step 214). Further, the transformed/quantized data is subjected to variable length encoding processing in the variable length encoding unit 104 (step 215) to be outputted as a bitstream 107. Thereafter, a determination about end of the encoding processing is made (step 216). When the determination is negative, the control returns back to the step of image input (step 204), and when the determination is affirmative, the processing is ended.

Figure 3:
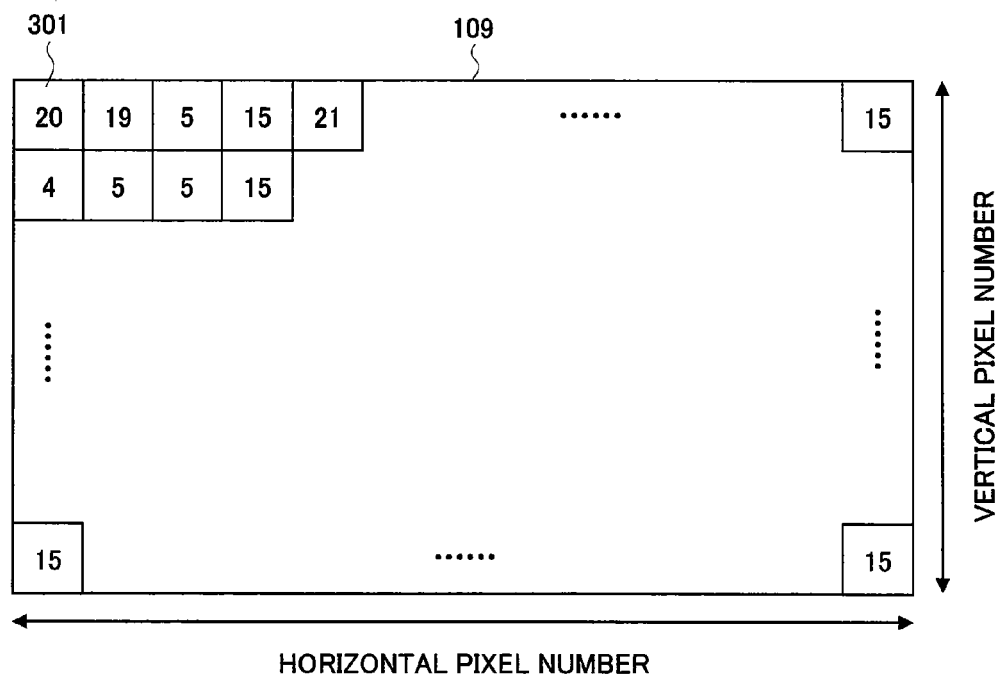
FIG. 3 is a diagram showing outline of an influenced picture number information table in the image encoding device according to the first embodiment of the present invention.

Next, the influenced picture number information table 109 in the image encoding device according to the present embodiment will be described. FIG. 3 is a diagram showing outline of the influenced picture number information table 109 in the image encoding device according to the present embodiment. The number of bits possessed by each element in the table is determined according to the maximum value of the influenced picture number. As the table, at least reference picture number+1 or more tables having elements equal to the number of pixels of targeted pictures to be coded are prepared. Adding 1 table here means adding a table for storing influenced picture number information about a picture being currently under encoding processing.

A table for a picture being currently under encoding processing is numbered "0", a table for the most previous picture is numbered "1", a table for the second previous picture is numbered "2", and the subsequent tables are handled similarly. As shown in FIG. 3, the influenced picture number information is stored at a position corresponding to each pixel. For example, the influenced picture number information regarding the top left-most pixel is stored at the top left-most position (301).

Figure 4:
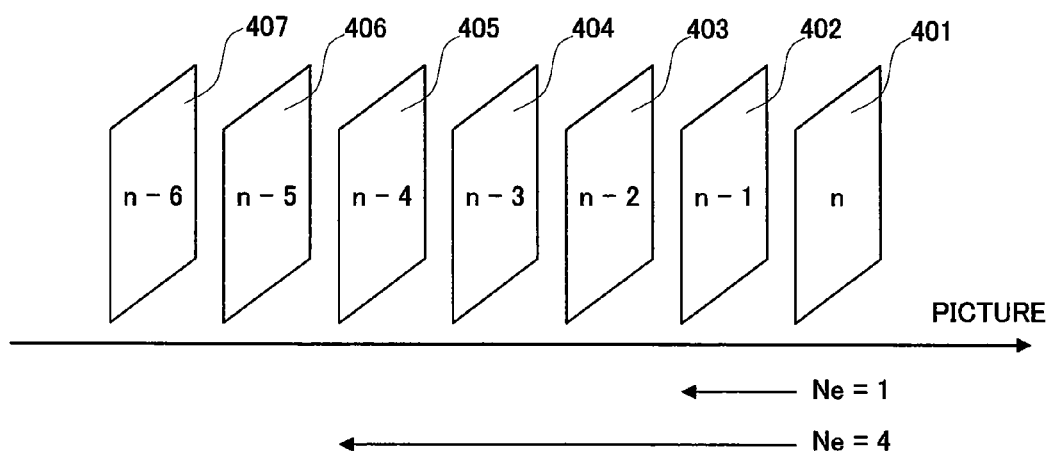
FIG. 4 is a conceptual diagram where pictures are arranged in the order of the processing at an image encoding according to the first embodiment of the present invention.

Next, the influenced picture number Ne in the image encoding device according to the present embodiment will be described. FIG. 4 is a conceptual diagram where pictures are arranged in the order of the processing at an image encoding in the image encoding device according to the present embodiment. A picture being currently processed is a picture 401 and a picture number thereof is "n". A picture previously processed is a picture 402, and a picture number thereof is "n-1". Thus, the picture numbers are given to the pictures according to the order of the pictures which have been subjected to the encoding processing.

The influenced picture number Ne is an index indicating the number of past pictures which can influence a corresponding area. For example, the influenced picture number Ne of the area influenced by the picture number n-1 (picture 402) is 1. The influenced picture number Ne of the area influenced by a picture number n-4 (picture 405) to the picture number n (picture 401) is 4. Note that, the influenced picture number Ne of the area influenced only by the picture number n (picture 401) is 0.

Figure 5:
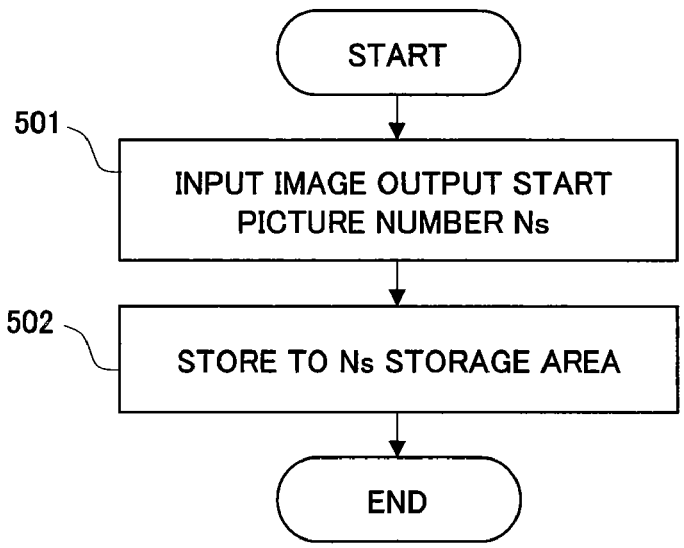
FIG. 5 is a flowchart at a setting of an image output start picture number Ns in the image encoding device according to the first embodiment of the present invention.

Next, a setting of the image output start picture number Ns 111 in the image encoding device according to the present embodiment will be described. FIG. 5 is a flowchart at a setting of the image output start picture number Ns 111 in the image encoding device according to the present embodiment. When the image output start picture number Ns 111 is inputted (step 501), the image output start picture number Ns 111 is stored in the Ns storage area 110 (step 502), and the processing is ended.

Here, it is considered that a memory or a register is used as the Ns storage area 110. And, the image output start picture number Ns 111 may be inputted/set externally according to operation of the image processing apparatus mounting the image encoding device by a user, or it may be calculated and set by any other means. Further, the image output start picture number Ns 111 may be written in the Ns storage area 110 upon establishing the image encoding device in advance. In such a case, this operation is not required.

Figure 6:
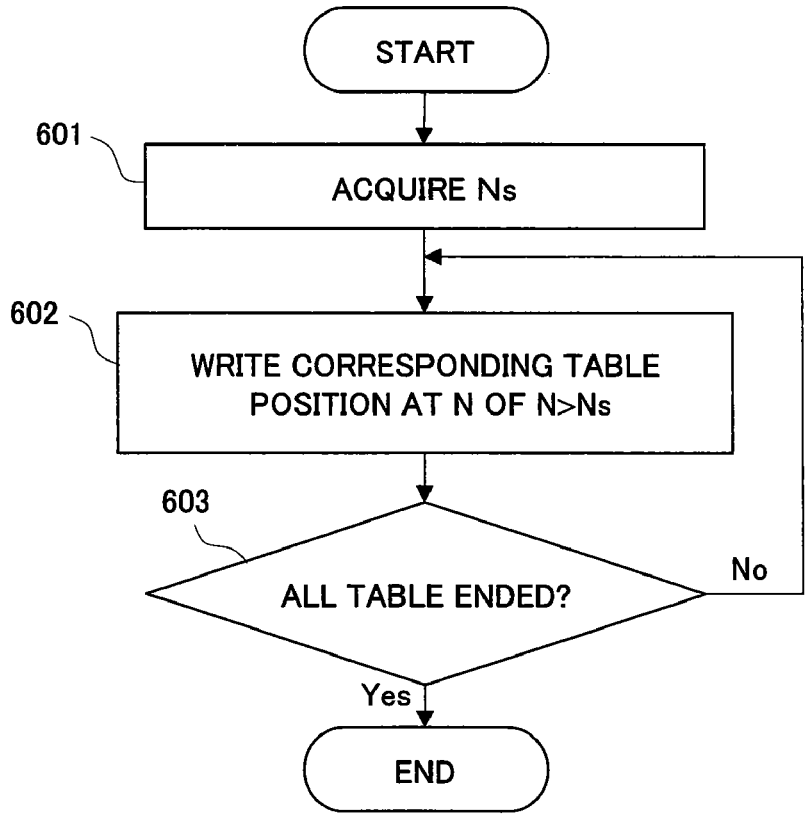
FIG. 6 is a flowchart showing an initialization operation of the influenced picture number information table in the image encoding device according to the first embodiment of the present invention.

Next, initialization of the influenced picture number information table 109 in the image encoding device according to the present embodiment will be described. FIG. 6 is a flowchart showing an initialization operation of the influenced picture number information table 109 in the image encoding device according to the present embodiment. First, the image output start picture number Ns 111 is acquired from the Ns storage area 110 (step 601). Next, by using "N" which is a numerical value larger than the image output start picture number Ns 111, for example, N=Ns+1, N is written in a corresponding area of the table, for example, the position of 301 shown in FIG. 3 (step 602). Next, a determination is made about whether or not writing in all the elements in all tables has been ended (step 603). When the determination is negative, the control returns back to step 602 where the writing is continued, and when the determination is affirmative, the processing is ended.

Figure 7:
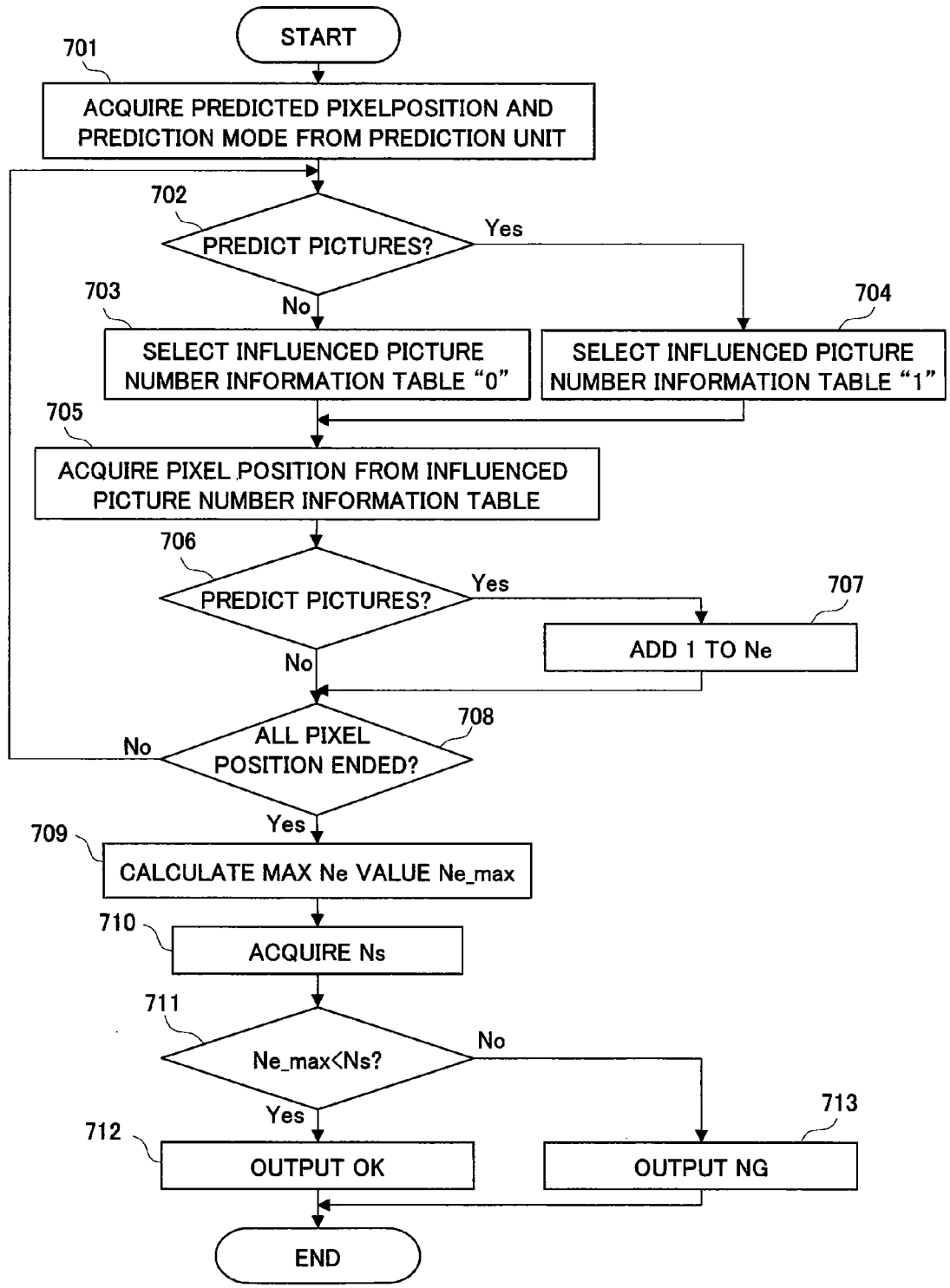
FIG. 7 is a flowchart showing an operation of a control unit of influenced picture number upon a prediction processing performance in the image encoding device according to the first embodiment of the present invention.

Next, an operation of the control unit of influenced picture number 108 in performing a prediction processing in the image encoding device according to the present embodiment will be described. FIG. 7 is a flowchart showing an operation of the control unit of influenced picture number 108 in performing the prediction processing according to the present embodiment. Here, a case where a picture most previously processed is referred to in an inter-frame prediction will be described.

First, pixel position information of a prediction area and a prediction mode are acquired from the prediction unit 102 (step 701). The prediction mode includes information about whether prediction to be conducted is the intra-frame prediction or the inter-frame prediction and another information about which picture has been referred to in the inter-frame prediction. In the image encoding device according to the present embodiment, a prediction picture is the most previous picture. Next, the prediction mode is determined (step 702), where, when the prediction mode is the inter-frame prediction, a table of "1" in the influenced picture number information table 109 is selected (step 704), and when the prediction mode is not the inter-frame prediction, a table of "0" is selected (step 703).

Next, the influenced picture number Ne of a corresponding pixel position on the selected table is acquired based on the pixel position information of the acquired prediction area (step 705). Thereafter, the prediction mode is determined (step 706), where, when the prediction mode is the inter-frame prediction, 1 is added to the influenced picture number Ne (step 707). Here, a determination is made about whether or not the processing of all pixel positions on the prediction area has been ended (step 708), where the determination is negative, the control returns back to the determination of the prediction mode about the next pixel position (step 702).

When the processing of all pixel positions has been ended, the maximum value Ne_max of the influenced picture number Ne is calculated (step 709), and the image output start picture number Ns 111 is acquired (step 710) so that the Ne_max and the image output start picture number Ns 111 are compared (step 711). In the case of Ne_max<Ns, an OK signal is outputted (step 712), and in the case of Ne_max≧Ns, an NG signal is outputted (step 713), and then the processing is ended.

Figure 8:
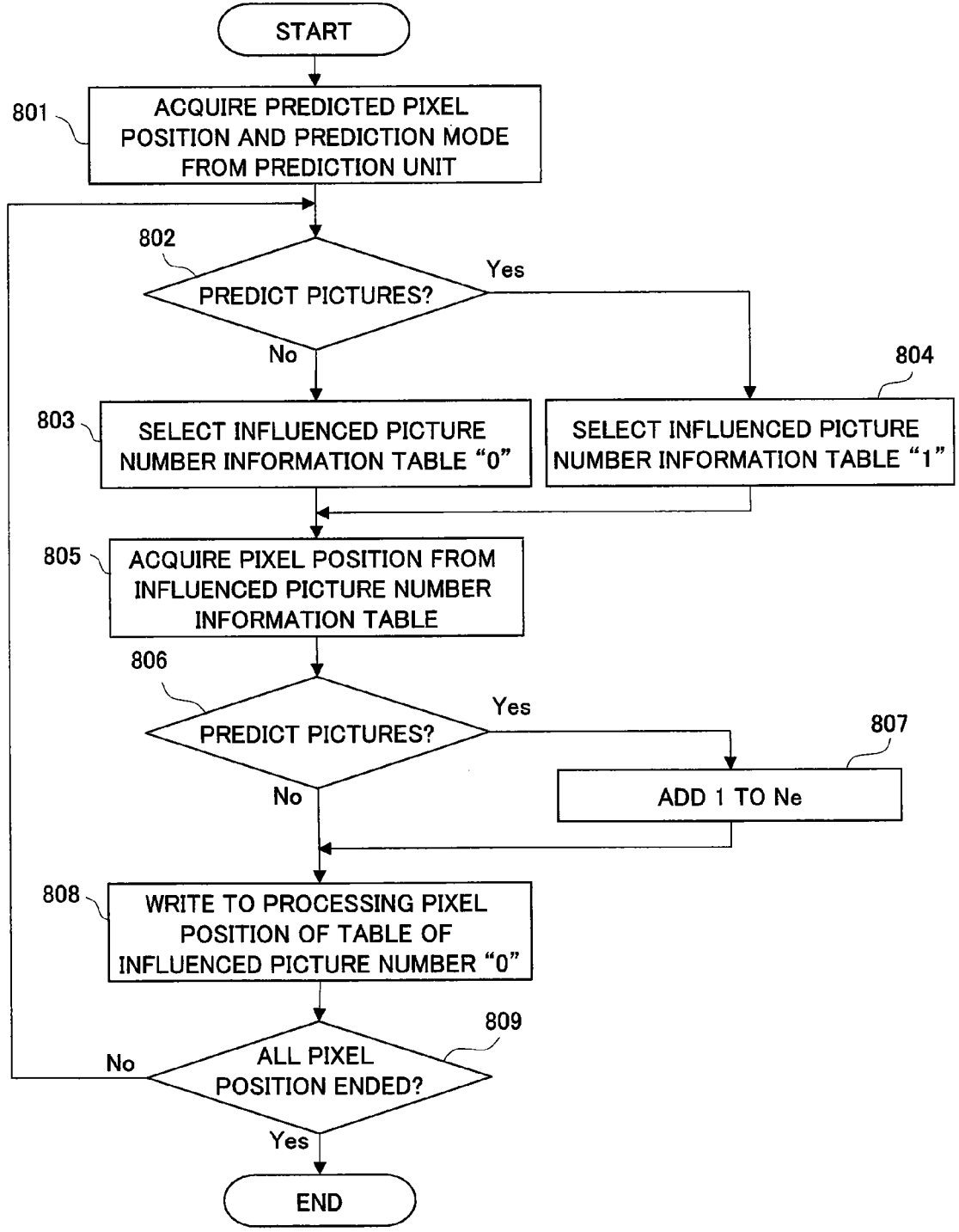
FIG. 8 is a flowchart showing an operation of the control unit of influenced picture number upon updating the influenced picture number information table in the image encoding device according to the first embodiment of the present invention.

Next, an operation of the control unit of influenced picture control 108 at update of the influenced picture number information table 109 in the image encoding device according to the present embodiment will be described. FIG. 8 is a flowchart showing an operation of the control unit of influenced picture number 108 at update of the influenced picture number information table 109 in the image encoding device according to the present embodiment. Here, a case where the most previous picture has been referred to in the inter-frame prediction will be described.

First, pixel position information of a prediction area and a prediction mode are acquired from the prediction unit 102 (step 801). The prediction mode includes information about whether prediction to be conducted is the intra-frame prediction or the inter-frame prediction and another information about which picture has been referred to in the inter-frame prediction. In the image encoding device according to the present embodiment, a prediction picture is the most previous picture. Next, the prediction mode is determined (step 802), where, when the prediction mode is the inter-frame prediction, a table of "1" in the influenced picture number information table 109 is selected (step 804), and when the prediction mode is not the inter-frame prediction, a table of "0" is selected (step 803).

Next, the influenced picture number Ne at a corresponding pixel position on the selected table is acquired based on the pixel position information of the acquired prediction area (step 805). Thereafter, the prediction mode is determined (step 806), where, when the prediction mode is the inter-frame prediction, 1 is added to the influenced picture number Ne (step 807). Then, the resultant influenced picture number Ne is written at a corresponding processing pixel position on the table of "0" of the influenced picture number information table 109 (step 808). Next, determination is made about whether or not the processing to all pixel positions on the prediction area has been ended (step 809). When the determination is negative, the control returns back to the step of determination of the prediction mode about the next pixel position (step 802), and, when the determination is affirmative, the processing is ended.

As explained above, in the image encoding device according to the present embodiment, while the image output start picture number Ns 111 is set, the influenced picture number Ne actually influencing the picture at the prediction processing is calculated for each pixel and managed, and control is performed such that the influenced picture number Ne becomes smaller than the image output start picture number Ns 111. Thereby, fluctuation of the data occurrence amount at the image encoding is suppressed so that encoding of an image allowing random access with low delay and high compression without requiring periodical insertion of I picture.

Note that, while only the case where a most previous picture is used as a reference picture at a time of the inter-frame prediction has been explained in the present embodiment, a picture to be used for prediction is not limited to the picture most previously processed and it may be a plurality of reference pictures including dual direction like a multi-reference of H.264/AVC.

In addition, in the present embodiment, while the processing of the image encoding device side to the image output start picture number Ns 111 has been explained, the image output start picture number Ns 111 may be stored in the bitstream 107 to be transmitted to the image decoding device side. In this case, the image decoding device can adjust a timing of image output utilizing the image output start picture number Ns 111.

<Second Embodiment>

Hereinafter, an image encoding device (encoder) according to a second embodiment of the present invention will be described. Since a configuration of a processing module of the image encoding device is similar to that shown in FIG. 1 according to the first embodiment, repetitive descriptions thereof will be omitted.

Figure 9:
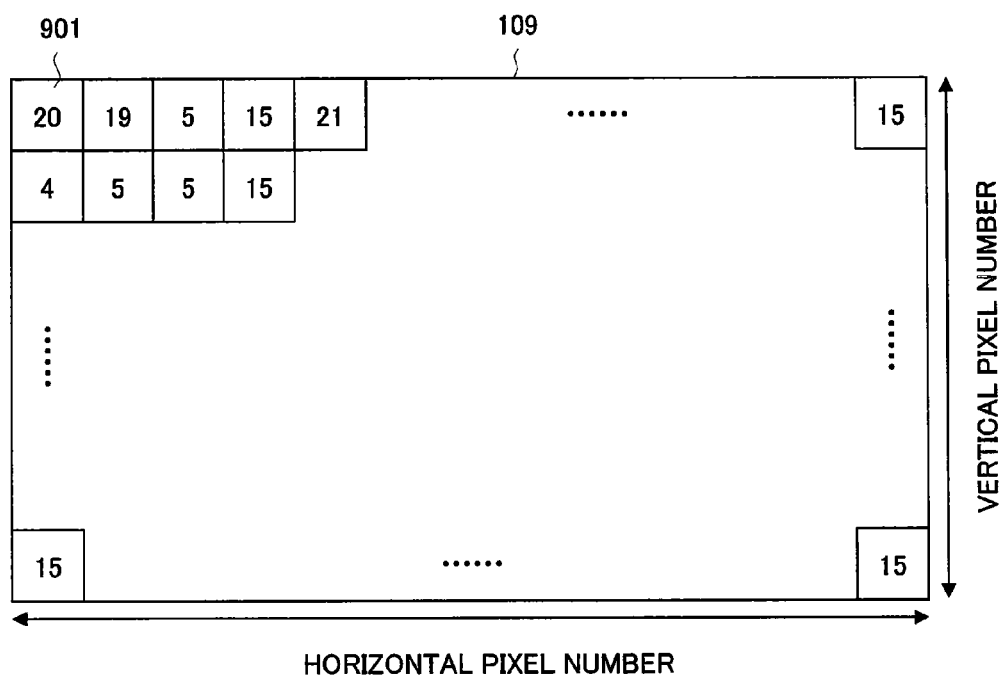
FIG. 9 is a diagram showing outline of an influenced picture number information table in an image encoding device according to a second embodiment of the present invention.

First, the influenced picture number information table 109 in the image encoding device according to the present embodiment will be described. FIG. 9 is a diagram showing outline of the influenced picture number information table 109 in the image encoding device according to the present embodiment. The number of bits possessed by each element on the table is determined according to the maximum value of the influenced picture number.

In the influenced picture number information table 109 in the image encoding device according to the present embodiment, unlike that according to the first embodiment, the influenced picture number information is stored per block. For example, when one block comprises 4 pixels×4 pixels, one element of table is provided to each 4 pixels×4 pixels. Therefore, at least the number of reference pictures+1 or more tables having the number of elements equal to the number of blocks of the targeted pictures to be encoded are prepared. Adding 1 is for a table storing influenced picture number information about a picture being currently under encoding processing.

A table for a picture being currently under coding is numbered "0", a table for the most previous picture is numbered "1", a table for the second previous picture is numbered "2", and the subsequent tables are handled similarly. As shown in FIG. 9, the influenced picture number information is stored at a position corresponding to each block. For example, when a block comprises 4 pixels×4 pixels, the influenced picture number information regarding the top leftmost 4 pixels×4 pixels is stored at the top leftmost position (901).

Next, determination of the influenced picture number Ne in the image encoding device according to the present embodiment will be described. In the image encoding device according to the present embodiment, since the influenced picture number Ne is handled for each block instead of each pixel, the following processing must be performed.

Figure 10:
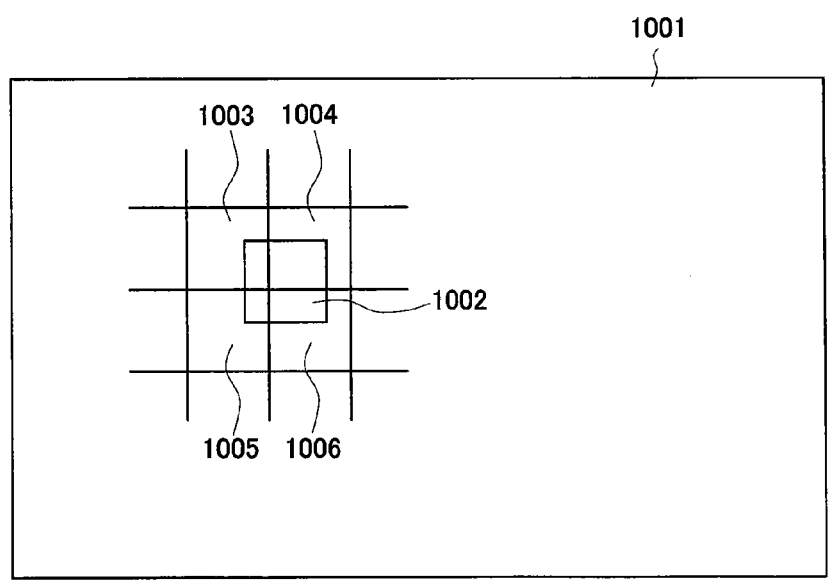
FIG. 10 is a conceptual diagram of a picture used for reference in the image encoding device according to the second embodiment of the present invention.

FIG. 10 is a conceptual diagram of a picture used for reference in the image encoding device according to the present embodiment. A reference picture 1001 is divided to blocks comprising pixels of the number equal to the number of pixels in a block configuring a unit for managing the influenced picture number Ne. Blocks 1003 to 1006 show some of the divided blocks. For example, assuming that an area referred to by a targeted area currently under processed is the area 1002 shown in FIG. 10, the area 1002 is influenced by the block 1003 to 1006, as shown in FIG. 10. Since management is conducted for each block, the influenced picture number Ne must take one value corresponding to one block. Therefore, the maximum value of the influenced picture number Ne of the related blocks (blocks 1003 to 1006) is selected to be used as the influenced picture number Ne regarding the area 1002.

Figure 11:
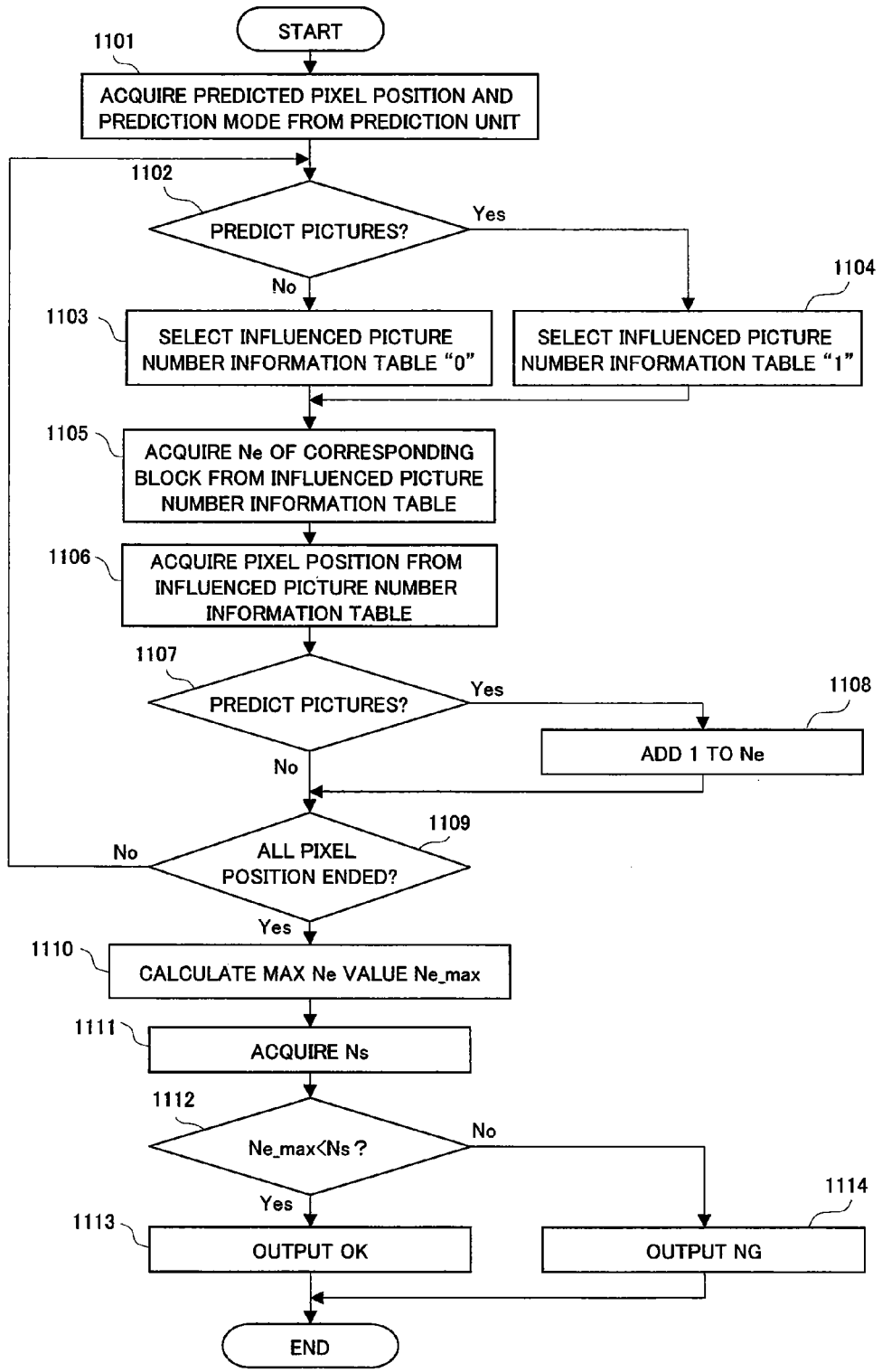
FIG. 11 is a flowchart showing an operation of a control unit of influenced picture number upon a prediction processing performance in the image encoding device according to the second embodiment of the present invention.

Next, an operation of the control unit of influenced picture number 108 at execution of a prediction process in the image encoding device according to the present embodiment will be described. FIG. 11 is a flowchart showing an operation of the control unit of influenced picture number 108 in execution of a prediction process in the image encoding device according to the present embodiment. Here, a case where a picture most previously processed in the inter-frame prediction has been referred to will be described.

First, pixel position information of a prediction area and a prediction mode are acquired from the prediction unit 102 (step 1101). The prediction mode includes information about whether prediction to be conducted is the intra-frame prediction or the inter-frame prediction and another information about which picture has been referred to in the inter-frame prediction. In the image encoding device according to the present embodiment, a prediction picture is the most previous picture. Next, the prediction mode is determined (step 1102), where, when the prediction mode is the inter-frame prediction, a table of "1" in the influenced picture number information table 109 is selected (step 1104), but when the prediction mode is not the inter-frame prediction, a table of "0" is selected (step 1103).

Next, a position of the corresponding block on the prediction area is calculated from the pixel position information of the acquired prediction area (step 1105), and the influenced picture number Ne of a corresponding block position on the selected table is acquired based on the block position (step 1106). Thereafter, the prediction mode is determined (step 1107), and 1 is added to the influenced picture number Ne at the time of the inter-frame prediction (step 1108). Here, a determination is made about whether or not the processing of all pixel positions on the prediction area has been ended (step 1109), where the determination is negative, the control returns back to the step of determination of the prediction mode about the next pixel position (step 1102).

When the processing of all pixel positions has been ended, the maximum value Ne_max of the influenced picture number Ne is calculated (step 1110), the image output start picture number Ns 111 is acquired (step 1111), and a comparison between the Ne_max and the image output start picture number Ns 111 is performed (step 1112). In the case where Ne_max<Ns, an OK signal is outputted (step 1113), and in the case where Ne_max<Ns, an NG signal is outputted (step 1114), and then the processing is ended.

Figure 12:
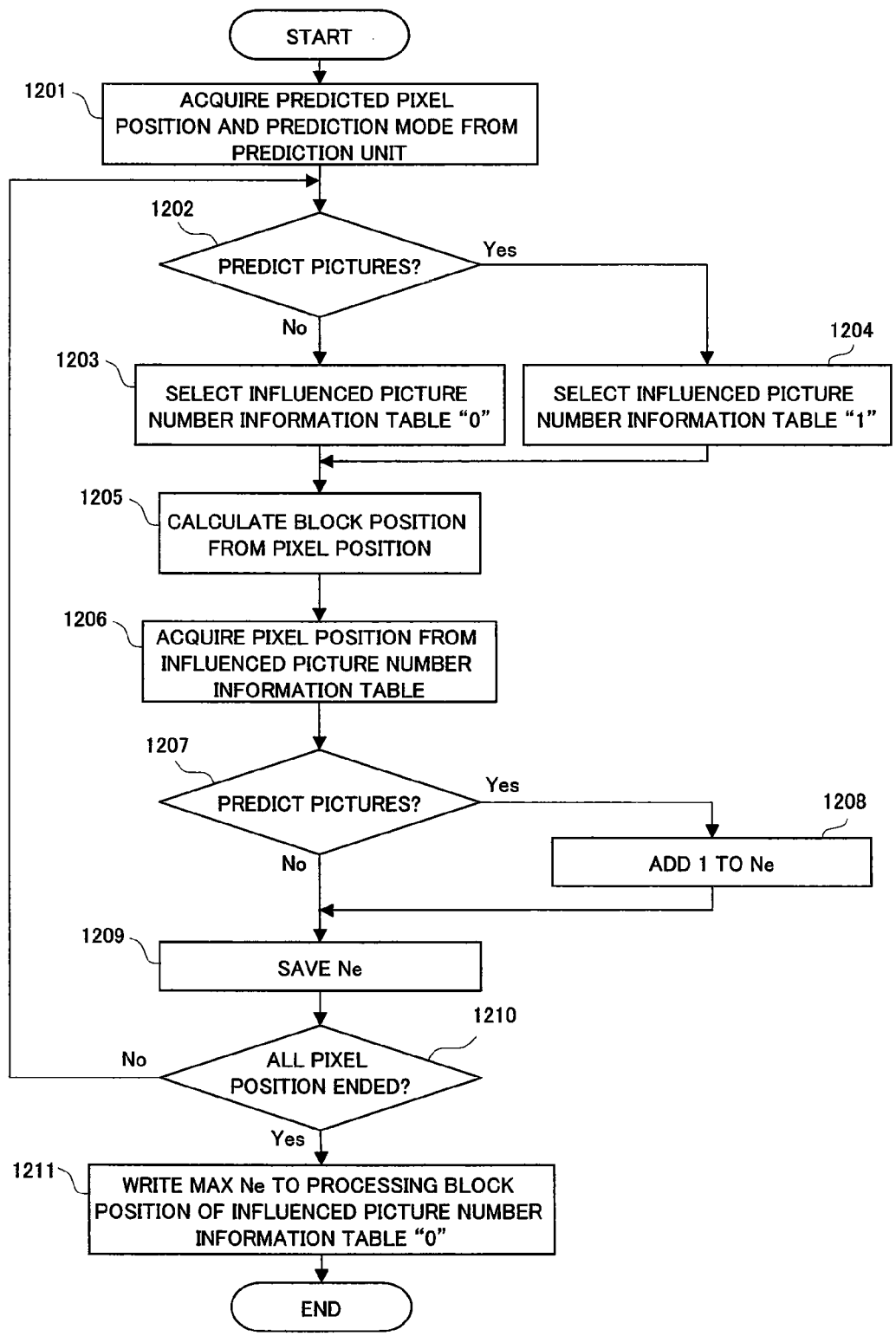
FIG. 12 is a flowchart showing an operation of the control unit of influenced picture number upon updating the influenced picture number information table in the image encoding device according to the second embodiment of the present invention.

Next, an operation of the control unit of influenced picture number 108 at updating of the influenced picture number information table 109 in the image encoding device according to the present embodiment will be described. FIG. 12 is a flowchart showing an operation of the control unit of influenced picture number 108 for update of the influenced picture number information table 109 in the image encoding device according to the present embodiment. Here, a case where a picture most previously processed is referred to in the inter-frame prediction will be described.

First, pixel position information of a prediction area and a prediction mode are acquired from the prediction unit 102 (step 1201). The prediction mode includes information about which prediction to be conducted, the intra-frame prediction or the inter-frame prediction, and another information about which picture has been referred to in the inter-frame prediction. In the image encoding device according to the present embodiment, a prediction picture is the most previous picture. Next, the prediction mode is determined (step 1202), where, when the prediction mode is the inter-frame prediction, a table of "1" in the influenced picture number information table 109 is selected (step 1204), and when the prediction mode is not the inter-frame prediction, a table of "0" is selected (step 1203).

Next, a position of the corresponding block on the prediction area is calculated from the pixel position information of the acquired prediction area (step 1205), and the influenced picture number Ne of a corresponding block position on the selected table is acquired based on the block position (step 1206). Thereafter, the prediction mode is determined (step 1207), and 1 is added to the influenced picture number Ne when the prediction mode is the inter-frame prediction (step 1208). Then, the resultant influenced picture number Ne is temporarily saved (step 1209). At this time, only when the resultant influenced picture number Ne is larger than the influenced picture number Ne previously saved, it is saved in an overwriting manner, so that the maximum value of the influenced picture number Ne on the prediction area is eventually retained.

Here, a determination is made about whether or not the processing of all pixel positions on the prediction area is ended (step 1210), and when the processing is not ended, the control returns back to the step of determination of the prediction mode for the next pixel position (step 1202). When the processing is ended, the maximum value of the influenced picture number Ne temporarily saved at step 1209 is written to the processing block position on the table of "0" of the influenced picture number information table 109 (step 1211), and then the processing is ended.

Note that, in the image encoding device according to the present embodiment, while it has been adopted a method for calculating the block position about each pixel on a prediction area, acquiring the influenced picture number Ne at the block position, and obtaining the maximum value on all pixel positions of the prediction area for obtaining the maximum value of the influenced picture number Ne on the prediction area, the method is only one example and the present invention is not limited to this method.

In this manner, according to this management of the influenced picture number information for each block, although it is less accurate in prediction as compared to that of the influenced picture number information for each pixel according to the first embodiment, it is capable of reducing the capacity of the influenced picture number information table 109.

As explained above, in the image encoding device according to the present embodiment, the image output start picture number Ns 111 is set in advance, the influenced picture number Ne actually influencing the picture at the prediction process is calculated for each block and managed, and control is performed such that the influenced picture number Ne is smaller than the image output start picture number Ns 111. Thereby, fluctuation of the data generation amount at the image encoding is suppressed so that enabling encoding of an image allowing random access can be performed with low delay and high compression without requiring periodical insertion of I picture.

Note that, while only the case where a most previous picture is used as a reference picture at a time of inter-frame prediction has been explained in the embodiment like the first embodiment, a picture to be used for prediction is not limited to the picture most previous and it may be a plurality of reference pictures including dual directions like a multi-reference in H.264/AVC.

Further, the processing of the image encoding device side to the image output start picture number Ns 111 has been described in the present embodiment like the first embodiment, but the image output start picture number Ns 111 may be stored in the bitstream 107 to be transmitted to the image decoding device side. In this case, the image decoding device can adjust a timing of image output utilizing the image output start picture number Ns 111.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention is applicable to a method for conducting encoding/decoding of a moving image allowing random access with a short delay time and high compression. More particularly, it can be utilized in an image encoding device, an image processing apparatus mounting the same, and the like.

What is claimed is:

1. An image encoding method in an image encoding device which gets inputted image data and conducts an encoding of the image data by a predetermined pixel block unit selectively using intra-frame prediction or inter-frame prediction in which a difference between a reference picture and the image data is encoded, wherein the image encoding device performs the steps of:

setting an output availability parameter indicating a specific range of past pictures where the image data can be fully and certainly decoded to be outputted if all past pictures fall within the range has been decoded when decoding the image data which has been encoded by the image encoding method;

calculating, for each target block in the image data to be encoded, influenced range indicating a range within which pictures encoded in the past influence the target block, during encoding the target block; and controlling a range of the reference picture at encoding so that the calculated influenced range does not exceed the image output availability parameter, wherein the step of controlling includes the sub-steps of:

when the inter-frame prediction is selected and the influenced range exceeds the output availability parameter, changing a prediction area to which the target block refers;

when the influenced range still exceeds the output availability parameter despite changing the prediction area, performing intra-frame prediction for the target block.

2. The image encoding method according to claim 1, wherein the image encoding device assigns picture numbers to the pictures according to the order of the encoding process, and the step of calculating the influenced range calculates the influence range from a difference between the picture number of the target block and the picture number of a picture influencing the target block.

3. The image encoding method according to claim 2, further comprising the step of preparing a table including elements as many as pixels in the image data regarding each of a picture being currently under encoding processing and the reference picture and storing the influenced range of each pixel, wherein the step of calculating the influenced range calculates the influenced range taking pixels in the image data as a unit.

4. The image encoding method according to claim 2, further comprising the step of preparing a table including elements as many as pixels in the image data regarding each of a picture being currently under encoding processing and the reference picture and storing an influenced range of each pixel wherein the step of calculating the influenced range information calculates the influenced range information taking the block data as a unit.

5. The image encoding method according to claim 4, wherein the step of calculating the influenced range calculates a value of the influenced range per block unit in the target block from a maximum value of the influenced range information of each corresponding block within the picture influencing the target block.

6. The image encoding method according to claim 1, wherein the image encoding device stores the output availability parameter into a bit stream which is encoded by the image encoding method and outputted, and transmits the output availability parameter to an image encoding device.

7. An image encoding device which gets image data inputted thereto and conducts an encoding of the image data by a predetermined pixel block unit selectively using intra-frame prediction or inter-frame prediction in which a difference between a reference picture and the image data is encoded, the image encoding device comprising:

a unit which retains an image output availability parameter indicating a specific range of past pictures where it is possible to fully and certainly decode the image data to output the same if all past pictures fall within the range have been decoded when decoding the image data which has been encoded by the image encoding device;

a unit which retains influenced range indicating a range within which pictures encoded in the past influence the target block, during encoding the target block; and a unit which calculates the influenced range and controls a range of the reference picture when encoding such that the influenced range calculated does not exceed the output availability parameter, wherein the step of controlling includes the sub-steps of:

when the inter-frame prediction is selected and the influences range exceeds the output availability parameter, changing a prediction area to which the target block refers;

when the influenced range still exceeds the output availability parameter despite changing the prediction area, performing intra-frame prediction for the target block.

8. The image encoding device according to claim 7, wherein the output availability parameter can be changed according to setting conducted externally.

9. A non-transitory computer-readable medium for selectively performing at least intra-frame prediction encoding and inter-frame prediction encoding using a reference picture about the image data and a difference between the reference picture and the image data, having sets of instructions stored thereon which, when executed by a computer, cause the computer to:

prepare a table including elements as many as pixels in the image data regarding each of a picture being currently under encoding processing and the reference picture and storing the number of influenced pictures indicating the number of past pictures necessary for decoding each pixel;

upon encoding the image data, acquire, with respect to a prediction area about the block which is a target to be encoded, the number of influenced pictures from the element corresponding to each pixel position of the prediction area of the table corresponding to the prediction area taking a pixel as an unit, and calculating a maximum value of the number of influenced pictures in the prediction area as influenced range information;

in a situation where the inter-frame prediction encoding is selected, when the influenced range information calculated exceeds the output availability parameter, the prediction area is set to another prediction area, and, when the influenced range information calculated exceeds the output availability parameter in all of the prediction areas, select the intra-frame prediction encoding so that a range of the reference picture upon encoding is controlled; and acquire the number of influenced pictures from the element corresponding to each element position of the prediction area in the table corresponding to the prediction area per the prediction area, and, if the prediction area has been predicted by the intra-frame prediction encoding according to the last picture, adding 1 to the number of influenced pictures acquired, and writing the number of influenced pictures to an element at a target pixel position to be subjected to a prediction encoding processing according to the prediction area of the table of the picture being currently under encoding processing.

10. The non-transitory computer-readable medium according to claim 9, wherein the sets of instructions when further executed by the computer, cause the computer to write a predetermined one of the number of influenced pictures to all elements in the table prepared.

* * * * *